US011163706B2

(12) United States Patent
Okbay et al.

(10) Patent No.: US 11,163,706 B2
(45) Date of Patent: Nov. 2, 2021

(54) HIGH BANDWIDTH SDRAM CONTROLLER

(71) Applicant: International Business Machines Corporation, Armonk, NY (US)

(72) Inventors: Bitwoded Okbay, Gilroy, CA (US); Michael J. Palmer, Southampton (GB); Jianwei Zhuang, San Jose, CA (US); Ailoan Tran, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/660,118

(22) Filed: Oct. 22, 2019

(65) Prior Publication Data
US 2021/0117348 A1 Apr. 22, 2021

(51) Int. Cl.
*G06F 13/16* (2006.01)
*G06F 3/06* (2006.01)
*G06F 1/12* (2006.01)

(52) U.S. Cl.
CPC .......... *G06F 13/1673* (2013.01); *G06F 1/12* (2013.01); *G06F 3/0607* (2013.01); *G06F 3/0656* (2013.01); *G06F 3/0658* (2013.01); *G06F 3/0673* (2013.01)

(58) Field of Classification Search
CPC .................................................. G06F 13/1673
USPC ......................................................... 711/154
See application file for complete search history.

(56) References Cited

U.S. PATENT DOCUMENTS

| | | | | |
|---|---|---|---|---|
| 5,438,671 A | * | 8/1995 | Miles | G06F 11/1458 709/247 |
| 5,581,728 A | * | 12/1996 | Moritomo | G06F 13/1673 710/20 |
| 6,480,927 B1 | | 11/2002 | Bauman | |
| 9,430,369 B2 | | 8/2016 | Doerr et al. | |
| 10,303,594 B2 | | 5/2019 | Koker et al. | |
| 2009/0177840 A1 | * | 7/2009 | Dale | H04L 67/2842 711/118 |
| 2010/0180006 A1 | * | 7/2010 | Nourbakhsh | G06F 13/1663 709/213 |

(Continued)

OTHER PUBLICATIONS

Sharma, Archana, et al., Construct High-Speed SDRAM Memory Controller Using Multiple FIFOs for AHB Memory Slave Interface, International Journal of Emerging Technology and Advanced Engineering, vol. 3, Issue 3, Mar. 2013.

(Continued)

*Primary Examiner* — Jae U Yu
(74) *Attorney, Agent, or Firm* — Nelson IP; Daniel P. Nelson

(57) ABSTRACT

A method for improving performance of a host bus adapter in a data storage system is disclosed. In one embodiment, such a method uses, as an interface to a memory controller contained within a host bus adapter, multiple two-way ports configured to operate in parallel. The method uses, within each two-way port, a read FIFO buffer for transferring read data across the two-way port and a write FIFO buffer for transferring write data across the two-way port. The method also uses the read FIFO buffer and the write FIFO buffer within each two-way port to provide speed-matching for different clock speeds that operate on opposite sides of the two-way port. A corresponding system and computer program product are also disclosed.

20 Claims, 5 Drawing Sheets

(56) References Cited

U.S. PATENT DOCUMENTS

2018/0307295 A1* 10/2018 Tameem ............... G06F 1/3206

OTHER PUBLICATIONS

Altera, "Using External Memory Interfaces to Achieve Efficient High-Speed Memory Solutions," White Paper, Altera Corporation, Nov. 2011, available at https://www.intel.com/content/dam/www/programmable/us/en/pdfs/literature/wp/wp-01169-high-speed-memory.pdf.

Nguyen, Xuan-Thuan, et al., "A Flexible High-Bandwidth Low-Latency Multi-Port Memory Controller," Vietnam Journal of Science and Technology, Jan. 2018.

IBM, "Simplifying an SDRAM Controller Design by Using Burst Length = 1 Exclusively," IP.com, No. IPCOM000022086D, Feb. 23, 2004.

Disclosed Anonymously, "Software Defined Network Adapter/Network Interface Controller for Increased Throughput and Processor Offloading," IP.com, No. IPCOM000246222D, May 17, 2016.

Siemens, et al. "Flow Control Based DMA Architecture," IP.com, No. IPCOM000174431D, Sep. 24, 2008.

* cited by examiner

HIGH BANDWIDTH SDRAM CONTROLLER

BACKGROUND

Field of the Invention

This invention relates to systems and methods for improving performance of host bus adapters in data storage systems.

Background of the Invention

In enterprise storage systems such as the IBM DS8000™ enterprise storage system, a storage controller may enable one or more host systems (e.g., open system and/or mainframe servers running operating systems such z/OS, zVM, or the like) to access data in one or more storage drives. In certain implementations, the storage controller includes one or more servers. Multiple servers may ensure that data is always available to connected host systems. When one server fails, the other server may pick up the I/O load of the failed server to ensure that I/O is able to continue between the host systems and backend storage volumes, which may be implemented on storage devices (e.g. hard disk drives, solid state drives, etc.) within the enterprise storage system. This process may be referred to as a "failover." During normal operation (when both servers are operational), the servers may manage I/O to different logical subsystems (LSSs) within the enterprise storage system. For example, in certain configurations, a first server may handle I/O to even LSSs, while a second server may handle I/O to odd LSSs.

Each server in the IBM DS8000™ enterprise storage system may include multiple host bus adapters (HBAs) to provide connectivity between external host systems and backend storage drives. These host bus adapters may relieve the storage controller of both data storage and retrieval tasks, and in so doing improve the performance of the storage controller. Because all I/O between host systems and backend storage drives must pass through the host bus adapters, the efficiency of the host bus adapters is critical to the performance (e.g., data throughput) of the storage controller. It follows that any improvements to the performance (e.g., data throughput) of the host bus adapters may improve the performance of the storage controller.

In view of the foregoing, what are needed are systems and methods to improve the performance of host bus adapters in storage systems such as the IBM DS8000™ enterprise storage system.

SUMMARY

The invention has been developed in response to the present state of the art and, in particular, in response to the problems and needs in the art that have not yet been fully solved by currently available systems and methods. Accordingly, embodiments of the invention have been developed to improve the performance of host bus adapters in data storage systems. The features and advantages of the invention will become more fully apparent from the following description and appended claims, or may be learned by practice of the invention as set forth hereinafter.

Consistent with the foregoing, a method for improving performance of a host bus adapter in a data storage system is disclosed. In one embodiment, such a method uses, as an interface to a memory controller contained within a host bus adapter, multiple two-way ports configured to operate in parallel. The method uses, within each two-way port, a read FIFO buffer for transferring read data across the two-way port and a write FIFO buffer for transferring write data across the two-way port. The method also uses the read FIFO buffer and the write FIFO buffer within each two-way port to provide speed-matching for different clock speeds that operate on opposite sides of the two-way port.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
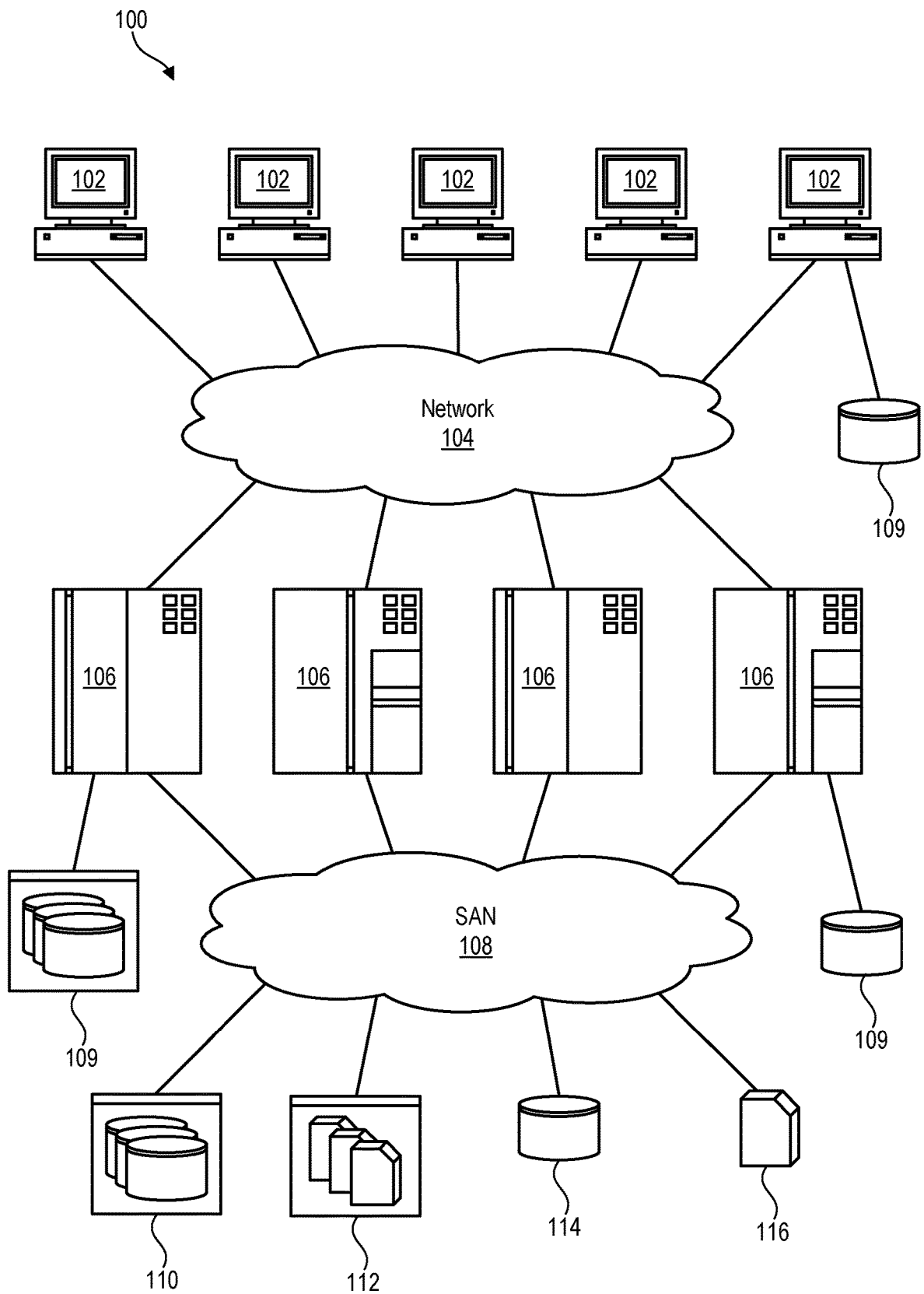
FIG. 1 is a high-level block diagram showing an example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 109 (e.g., arrays of hard-storage drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard or protocol such as Fibre Channel (FC) or iSCSI.

Figure 2:
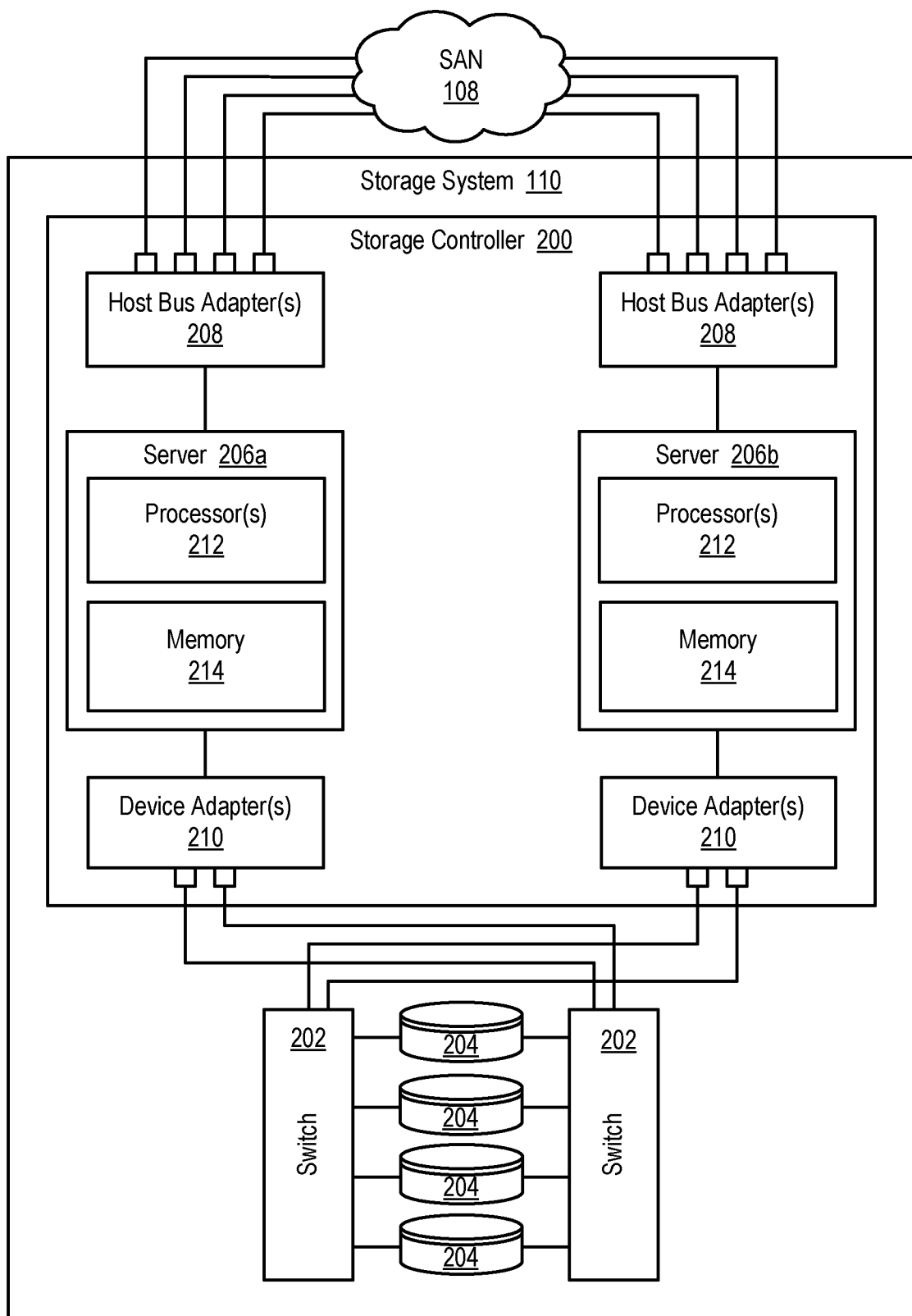
FIG. 2 is a high-level block diagram showing one embodiment of a storage system for use in the network environment of FIG. 1.

Referring to FIG. 2, one example of a storage system 110 containing an array of hard-disk drives 204 and/or solid-state drives 204 is illustrated. The storage system 110 is illustrated to show an exemplary environment in which systems and methods in accordance with the invention may be implemented. As shown, the storage system 110 includes a storage controller 200, one or more switches 202, and one or more storage drives 204, such as hard-disk drives 204 and/or solid-state drives 204 (e.g., flash-memory-based drives 204). The storage controller 200 may enable one or more host systems 106 (e.g., open system and/or mainframe servers 106 running operating systems such z/OS, zVM, or the like) to access data in the one or more storage drives 204.

In selected embodiments, the storage controller 200 includes one or more servers 206a, 206b. The storage controller 200 may also include host bus adapters 208 and device adapters 210 to connect the storage controller 200 to host devices 106 and storage drives 204, respectively. Multiple servers 206a, 206b may provide redundancy to ensure that data is always available to connected host systems 106. Thus, when one server 206a fails, the other server 206b may pick up the I/O load of the failed server 206a to ensure that I/O is able to continue between the host systems 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes 322 implemented on the storage drives 204.

One example of a storage system 110 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
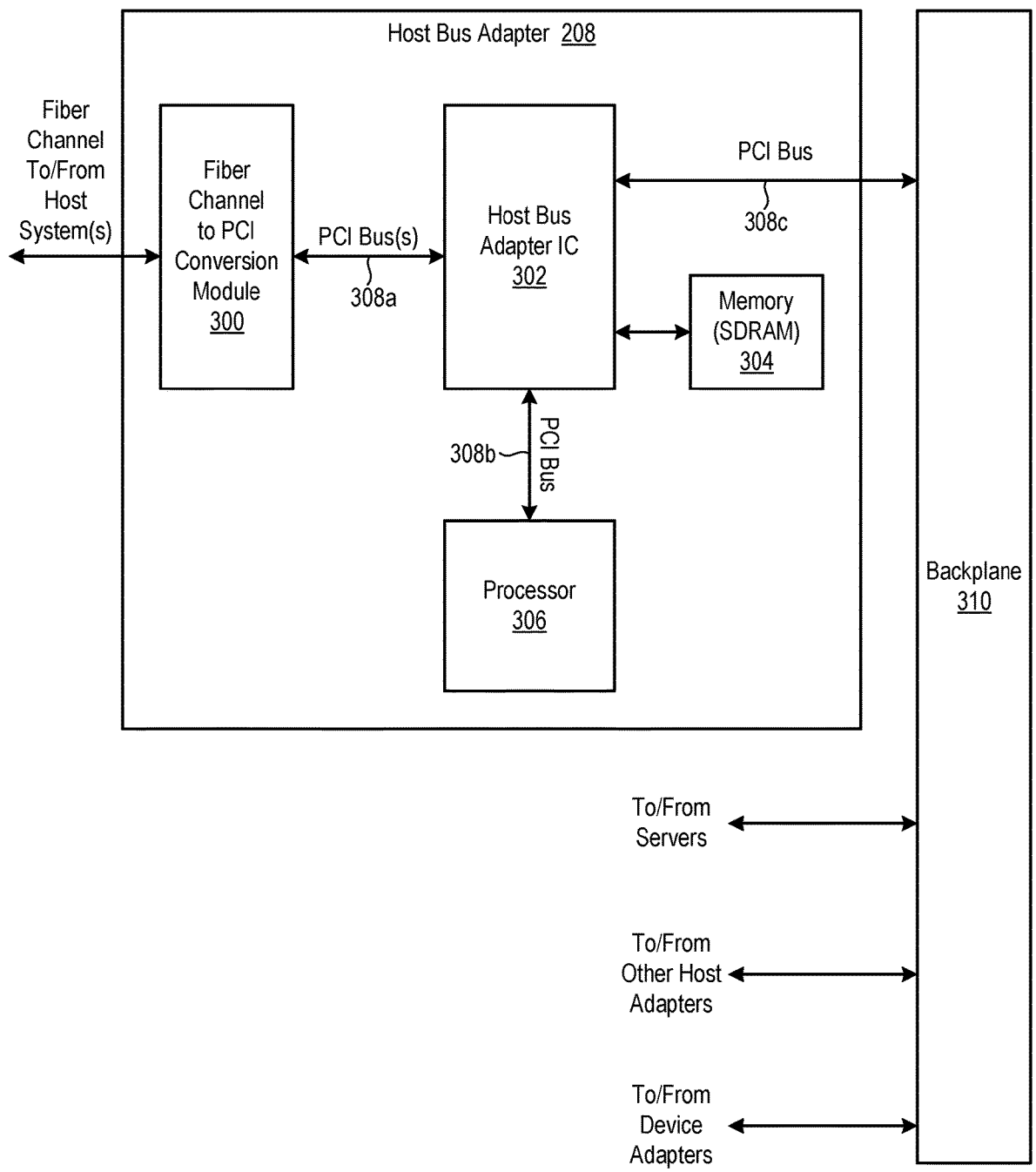
FIG. 3 is a high-level block diagram showing various internal components within a host bus adapter.

Referring to FIG. 3, as previously mentioned, each server 206 in a storage system 110 such as the IBM DS8000™ enterprise storage system may include multiple host bus adapters (HBAs) 208 to provide connectivity between external host systems 106 and/or backend storage drives 204. These host bus adapters 208 may relieve the storage controller 200 of both data storage and retrieval tasks, and in so doing improve the performance of the storage controller 200. Because all I/O between host systems 106 and backend storage drives 204 pass through the host bus adapters 208, the efficiency of the host bus adapters 208 is critical to the performance (e.g., data throughput) of the storage controller 200. It follows that any improvements to the performance (e.g., data throughput) of the host bus adapters 208 may improve the performance of the storage controller 200. Thus, systems and methods are needed to improve the performance of host bus adapters 208 in storage systems 110 such as the IBM DS8000™ enterprise storage system.

FIG. 3 is a high-level block diagram showing various internal components that may be included within a host bus adapter 208 in accordance with the invention. Such a host bus adapter 208 may, in certain embodiments, communicate with host systems 106 using a networking technology such as Fibre Channel. When read or write requests are received by the host bus adapter 208 over Fibre Channel, a conversion module 300 may convert the Fibre Channel signals to a protocol suitable for transmission over a bus 308a, such as a PCI or PCIe bus 308a. These converted signals may be received by a host bus adapter integrated circuit (IC) 302. The host bus adapter IC 302 may contain various components, including a memory controller 406, to access a memory 304 (e.g., SDRAM memory 304) within the host bus adapter 208. In certain embodiments, the host bus adapter IC 302 is implemented as an application-specific integrated circuit (ASIC) customized for the host bus adapter 208. The functionality of the host bus adapter IC 302, as well as its internal components, will be discussed in more detail in association with FIGS. 4 and 5.

As further shown in FIG. 3, the host bus adapter IC 302 may interface with a processor 306 by way of a bus 308b, such as a PCI or PCIe bus 308b. In certain embodiments, the operation of the host bus adapter 208 may be managed by microcode running on the processor 306. For example, the microcode may configure chips or components on the host bus adapter 208, such as the host bus adapter IC 302, at the time the host bus adapter 208 is initialized. The microcode may also initialize direct-memory-access (DMA) descriptors in memory and start DMA operations that are then executed by the host bus adapter IC 302.

As shown in FIG. 3, the host bus adapter IC 302 may interface with a backplane 310 in the storage controller 200 by way of a bus 308c, such as a PCI or PCIe bus 308c. This backplane 310 may provide means for transferring data and signals between the host bus adapter 208, servers 206, device adapters 210, and other host bus adapters 208 within the storage controller 200.

Figure 4:
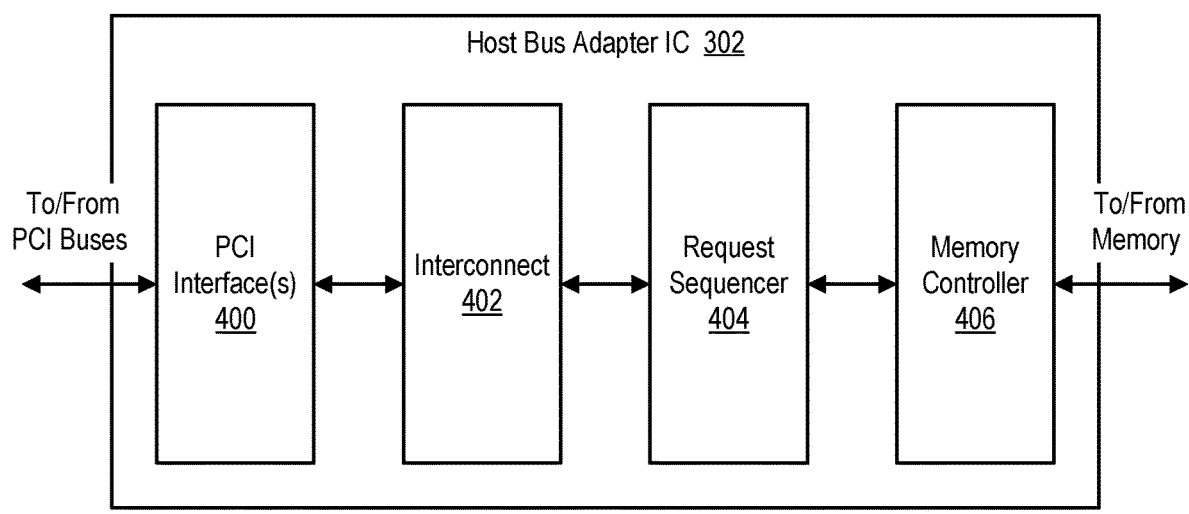
FIG. 4 is a high-level block diagram showing various internal components within a host bus adapter integrated circuit.

Referring to FIG. 4, a high-level block diagram showing various internal components within a host bus adapter IC 302 is illustrated. As shown, the host bus adapter IC 302 includes interfaces 400, such as PCI interfaces 400, to communicate with the PCI buses 308a-c illustrated in FIG. 3. The interfaces 400 may, in turn, communicate with an interconnect 402 that provides connectivity between the interfaces 400 and a request sequencer 404 within the host bus adapter IC 302. The request sequencer 404 may receive I/O requests (e.g., read and/or write requests) from different masters (i.e., requesters) connected to or communicating with the PCI buses 308a-c. These masters may include, for example, host systems 106, the servers 206, other host bus adapters 208, device adapters 210, the processor 306, DMA engines on the host bus adapter IC 302, or the like. In general, the request sequencer 404 may stage or sequence I/O requests that are received from the masters in accordance with an algorithm. The request sequencer 404 may provide these I/O requests to a memory controller 406. The memory controller 406 may in turn queue or process the I/O requests in the order they are received from the request sequencer 404. For example, the memory controller 406 may execute read requests by retrieving data from the memory 304, and execute write requests by writing data to the memory 304, in the order the requests are received from the request sequencer 404. The request sequencer 404 may, in certain embodiments, be considered part of the memory controller 406 although it may also be a separate component.

Figure 5:
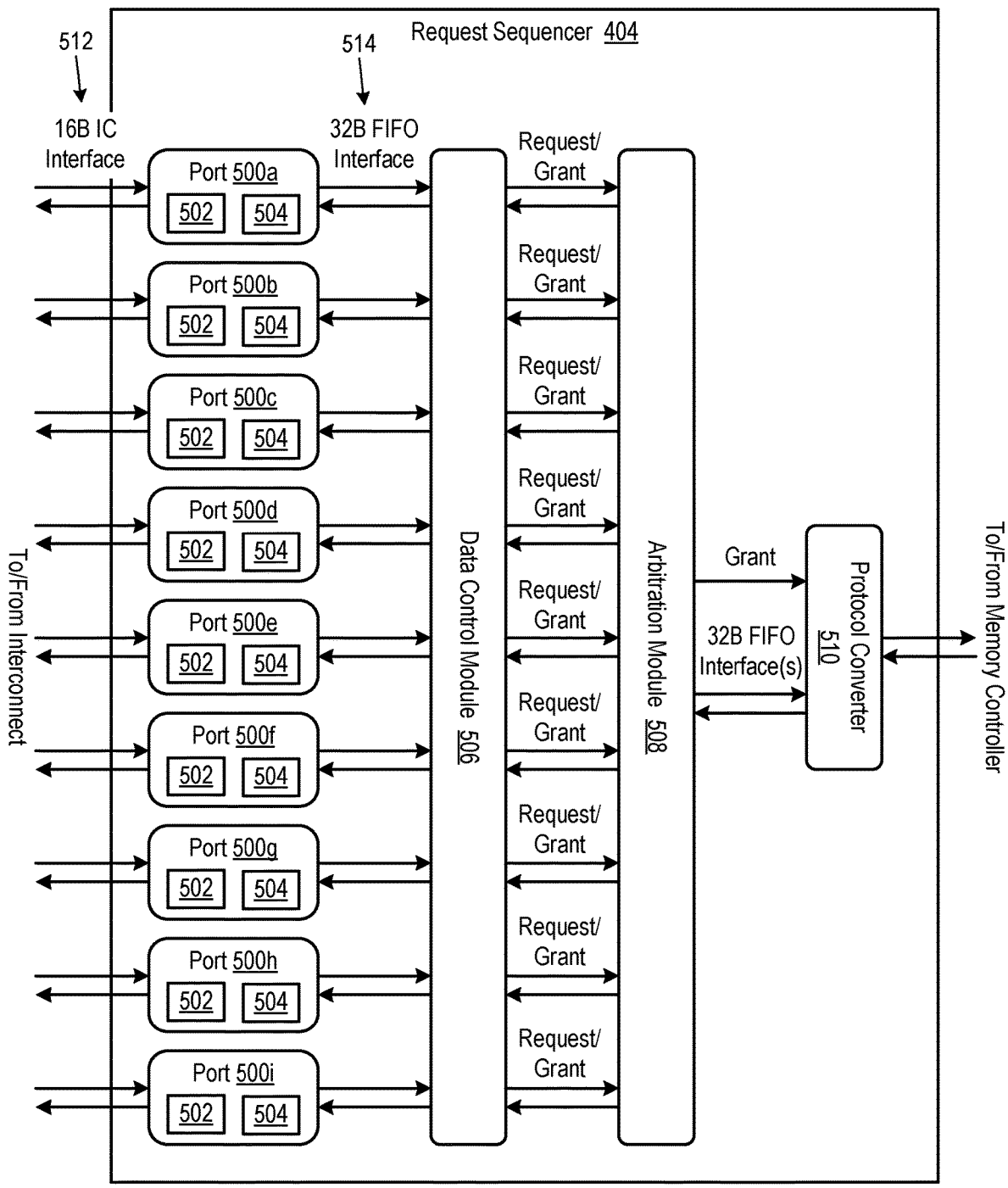
FIG. 5 is a high-level block diagram showing various internal components within the request sequencer shown in FIG. 4.

Referring to FIG. 5, a more detailed embodiment of a request sequencer 404 is illustrated. Such a request sequencer 404 may be configured to support very high throughput of read and write requests. As shown, the request sequencer 404 includes a plurality of two-way ports 500a-i (in this example nine) to connect various masters to the memory controller 406. In certain embodiments, a different master may communicate with each two-way port 500 by way of the interconnect 402. In certain embodiments, each two-way port 500 includes a read FIFO (first-in-first-out) buffer 502 and a write FIFO buffer 504. The read FIFO buffer 502 may be used to transfer read data across the two-way port 500 and the write FIFO buffer 504 may be used to transfer write data across the two-way port 500. The read FIFO buffers 502 and write FIFO buffers 504 may also be used to provide speed matching across the two-way ports 500. For example, the interconnect 402 may operate at a first clock speed while the memory controller 406 may operate at a second clock speed that differs from the first clock speed. The read FIFO buffers 502 and write FIFO buffers 504 may enable data transfer between devices operating at these different clock speeds.

As shown in FIG. 5, buses 512, 514 coupled to each side of the two-way ports 500 may, in certain embodiments, have different bus widths. For example, each two-way port 500 may communicate with the interconnect 402 over a bus 512 that is sixteen bytes wide, and communicate with the memory controller 406 over a bus 514 that is thirty-two bytes wide. The read FIFO buffers 502 and write FIFO buffers 504 may be used as intermediaries to convert data from one bus width to the other. The read FIFO buffers 502 and the write FIFO buffers 504 may be accessed independently and simultaneously. In other words, the write FIFO buffers 504 may be filled at the same time that the read FIFO buffers 502 are drained.

A data control module 506 may be provided within the request sequencer 404 to receive incoming I/O requests from the two-way ports 500 and provide the I/O requests to an arbitration module 508. The arbitration module 508 may determine which I/O requests are forwarded to the memory controller 406 and the order in which they are transmitted. In certain embodiments, the data control module 506 may submit requests to transfer I/O requests to the arbitration module 508 and the arbitration module 508 may grant the requests in accordance with a designated algorithm. The arbitration module 508 may control the order in which I/O requests are transferred to the memory controller 406 based on the order and timing in which it grants the requests made by the data control module 506. When a request is granted, the output of a selected two-way port 500 is presented to a protocol converter 510, which converts the output to a protocol that is understood by the memory controller 406. When the request is granted, the read FIFO buffer 502 of the corresponding two-way port 500 is filled and/or its write FIFO buffer 504 is drained. In this way, each two-way port 500 may gain access to the memory controller 406 and memory 304 by way of the arbitration module 508.

In certain embodiments, the arbitration module 508 may be configured to avoid conflicts between I/O requests originating from different masters in order to keep the memory 304 coherent. For example, if the arbitration module 508 receives, from the data control module 506, a request in association with a first master that attempts to write to a block of memory 304 that is already being accessed by a second master, the arbitration module 508 may attempt to delay granting the request associated with the first master until the second master finishes its access. The arbitration module 508 may accomplish this in part by comparing block addresses associated with incoming requests to block addresses that are already being accessed. Once the second master has finished accessing the block of memory 304, the arbitration module 508 may grant the request associated with the first master and transmit the I/O request to the memory controller 406 so that the block of memory 304 may be accessed by the first master. In this way, the arbitration module 508 may maintain data integrity and keep the memory 304 coherent.

In certain embodiments, each of the read FIFO buffers 502 and each of the write FIFO buffers 504 may be designed with a certain physical storage capacity (e.g., 2 kilobytes). However, the request sequencer 404 and memory controller 406 may treat each of the read FIFO buffers 502 and the write FIFO buffers 504 as having a functional storage capacity (e.g., 1 kilobyte) that is less than their physical storage capacity. This implementation enables the memory controller 406 and/or request sequencer 404 to more easily detect and take appropriate action when a read FIFO buffer 502 and/or write FIFO buffer 504 is half full. The read FIFO buffers 502 and write FIFO buffers 504 may be accessed in a "ping pong" fashion, meaning that a master may toggle between the two buffers 502, 504 to process read requests and write requests respectively.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for improving performance of a host bus adapter in a data storage system, the method comprising:
using, as an interface to a memory controller contained within a host bus adapter, multiple two-way ports configured to operate in parallel;
using, within each two-way port, a read FIFO buffer for transferring read data and a write FIFO buffer for transferring write data;
arbitrating, within the host bus adapter, incoming I/O requests received at each of the two-way ports, wherein arbitrating comprises comparing block addresses associated with the incoming I/O requests to block addresses currently being accessed in memory of the host bus adapter;
delaying, by the host bus adapter, granting the incoming I/O requests that have block addresses that are currently being accessed in the memory of the host bus adapter; and granting, by the host bus adapter, incoming I/O requests that have block addresses that are not currently being accessed in the memory of the host bus adapter.

2. The method of claim 1, further comprising utilizing a first bus width on a first side of each two-way port.

3. The method of claim 2, further comprising utilizing a second bus width on a second side of each two-way port.

4. The method of claim 3, wherein the first bus width is different than the second bus width.

5. The method of claim 1, wherein the memory controller is an SDRAM memory controller.

6. The method of claim 1, wherein each of the read FIFO buffers and each of the write FIFO buffers has a physical storage capacity.

7. The method of claim 6, wherein each of the read FIFO buffers and each of the write FIFO buffers are treated as having a functional storage capacity less than their physical storage capacity.

8. A computer program product for improving performance of a host bus adapter in a data storage system, the computer program product comprising a computer-readable medium having computer-usable program code embodied therein, the computer-usable program code configured to perform the following when executed by at least one processor:
   use, as an interface to a memory controller contained within a host bus adapter, multiple two-way ports configured to operate in parallel;
   use, within each two-way port, a read FIFO buffer for transferring read data and a write FIFO buffer for transferring write data;
   arbitrate, within the host bus adapter, incoming I/O requests received at each of the two-way ports, wherein arbitrating comprises comparing block addresses associated with the incoming I/O requests to block addresses currently being accessed in memory of the host bus adapter;
   delay, by the host bus adapter, granting the incoming I/O requests that have block addresses that are currently being accessed in the memory of the host bus adapter; and
   grant, by the host bus adapter, incoming I/O requests that have block addresses that are not currently being accessed in the memory of the host bus adapter.

9. The computer program product of claim 8, wherein the computer-usable program code is further configured to utilize a first bus width on a first side of each two-way port.

10. The computer program product of claim 9, wherein the computer-usable program code is further configured to utilize a second bus width on a second side of each two-way port.

11. The computer program product of claim 10, wherein the first bus width is different than the second bus width.

12. The computer program product of claim 8, wherein the memory controller is an SDRAM memory controller.

13. The computer program product of claim 8, wherein each of the read FIFO buffers and each of the write FIFO buffers has a physical storage capacity.

14. The computer program product of claim 13, wherein each of the read FIFO buffers and each of the write FIFO buffers are treated as having a functional storage capacity less than their physical storage capacity.

15. A system comprising:
   a storage controller;
   a host bus adapter for facilitating data flow through the storage controller, the host bus adapter configured to:
      use, as an interface to a memory controller contained within the host bus adapter, multiple two-way ports configured to operate in parallel;
      use, within each two-way port, a read FIFO buffer for transferring read data and a write FIFO buffer for transferring write data;
      arbitrate, within the host bus adapter, incoming I/O requests received at each of the two-way ports, wherein arbitrating comprises comparing block addresses associated with the incoming I/O requests to block addresses currently being accessed in memory of the host bus adapter;
      delay, by the host bus adapter, granting the incoming I/O requests that have block addresses that are currently being accessed in the memory of the host bus adapter; and
      grant, by the host bus adapter, incoming I/O requests that have block addresses that are not currently being accessed in the memory of the host bus adapter.

16. The system of claim 15, further comprising a first bus width on a first side of each two-way port.

17. The system of claim 16, further comprising a second bus width on a second side of each two-way port.

18. The system of claim 17, wherein the first bus width is different than the second bus width.

19. The system of claim 15, wherein each of the read FIFO buffers and each of the write FIFO buffers has a physical storage capacity.

20. The system of claim 19, wherein each of the read FIFO buffers and each of the write FIFO buffers are treated as having a functional storage capacity less than their physical storage capacity.

* * * * *